United States Patent
Wüst et al.

(10) Patent No.: US 10,700,565 B2
(45) Date of Patent: Jun. 30, 2020

(54) STATOR ARRANGEMENT, ELECTRIC THREE-PHASE GENERATOR AND METHOD FOR PRODUCING A STATOR ARRANGEMENT

(71) Applicant: Brose Fahrzeugteile GmbH & Co. Kommanditgesellschaft, Würzburg, Würzburg (DE)

(72) Inventors: Stefan Wüst, Partenstein (DE); Daniel Fiederling, Wertheim (DE); Wolfgang Strauss, Unterpleichfeld (DE)

(73) Assignee: BROSE FAHRZEUGTEILE GMBH & CO. KOMMANDITGESELLSCHAFT, WÜRZBURG, Würzburg (DE)

( * ) Notice: Subject to any disclaimer, the term of this patent is extended or adjusted under 35 U.S.C. 154(b) by 243 days.

(21) Appl. No.: 15/735,778

(22) PCT Filed: Jul. 7, 2016

(86) PCT No.: PCT/EP2016/066081
§ 371 (c)(1),
(2) Date: Jan. 2, 2018

(87) PCT Pub. No.: WO2017/005836
PCT Pub. Date: Jan. 12, 2017

(65) Prior Publication Data
US 2018/0183290 A1    Jun. 28, 2018

(30) Foreign Application Priority Data
Jul. 9, 2015 (DE) .................. 10 2015 212 821

(51) Int. Cl.
*H02K 3/52* (2006.01)
*H02K 3/28* (2006.01)
(Continued)

(52) U.S. Cl.
CPC .............. *H02K 3/28* (2013.01); *H02K 1/16* (2013.01); *H02K 3/12* (2013.01); *H02K 3/522* (2013.01);
(Continued)

(58) Field of Classification Search
CPC ........... H02K 3/28; H02K 3/52; H02K 3/521; H02K 3/522; H02K 3/38
(Continued)

(56) References Cited

U.S. PATENT DOCUMENTS 5,900,687 A * 5/1999 Kondo .................. H02K 3/522
310/260
6,177,741 B1 * 1/2001 Lutkenhaus ............. H02K 3/47
310/71

(Continued)

FOREIGN PATENT DOCUMENTS

DE    10261611 A1    7/2004
DE    10328720 A1    1/2005
(Continued)

OTHER PUBLICATIONS

International Search Report from International Patent Application No. PCT/EP2016/066081, dated Oct. 5, 2016, 4 pages.
(Continued)

*Primary Examiner* — Burton S Mullins
(74) *Attorney, Agent, or Firm* — Westman, Champlin & Koehler, P.A.

(57) ABSTRACT

The present invention provides a stator arrangement for an electric three-phase generator, comprising a plurality of stator teeth, comprising a contacting device which is arranged on an end portion of the stator teeth, comprising a continuously wound winding wire which is wound in each case about individual stator teeth in order to form stator tooth windings and portions of which are arranged on the
(Continued)

contacting device between the individual stator teeth, comprising a connecting element, which is arranged on the contacting device and designed to electrically connect portions of the winding wire arranged on the contacting device in order to form a star point. The present invention further provides an electric three-phase generator and a method for producing a stator arrangement.

17 Claims, 15 Drawing Sheets

(51) Int. Cl.
*H02K 1/16* (2006.01)
*H02K 3/12* (2006.01)
*H02K 15/02* (2006.01)
*H02K 15/085* (2006.01)

(52) U.S. Cl.
CPC ......... *H02K 15/024* (2013.01); *H02K 15/085* (2013.01); *H02K 2203/06* (2013.01)

(58) Field of Classification Search
USPC .............................................................. 310/71
See application file for complete search history.

(56) References Cited

U.S. PATENT DOCUMENTS

| | | | |
|---|---|---|---|
| 6,914,356 B2* | 7/2005 | Yamamura | H02K 3/50 310/71 |
| 7,262,529 B2 | 8/2007 | Klappenbach et al. | |
| 7,569,958 B2* | 8/2009 | Matsuzaki | H02K 3/524 310/43 |
| 7,626,303 B2* | 12/2009 | Watanabe | H02K 3/522 310/194 |
| 7,876,015 B2* | 1/2011 | Sakata | H02K 3/522 310/194 |
| 8,076,819 B2* | 12/2011 | Taema | H02K 3/345 310/214 |
| 8,497,618 B2* | 7/2013 | Kato | H02K 3/28 310/215 |
| 8,878,407 B2* | 11/2014 | Ikura | H02K 3/522 29/598 |
| 9,673,676 B2 | 6/2017 | Kim et al. | |
| 2015/0188378 A1 | 7/2015 | Kim et al. | |
| 2016/0079822 A1* | 3/2016 | Noguchi | F04D 29/18 310/71 |

FOREIGN PATENT DOCUMENTS

| | | |
|---|---|---|
| DE | 202005016915 U1 | 2/2006 |
| DE | 102011082665 A1 | 3/2013 |
| DE | 102012016914 A1 | 2/2014 |
| EP | 2457864 A2 | 5/2012 |
| JP | 2007-110848 A | 4/2007 |
| KR | 10-1354699 B1 | 1/2014 |

OTHER PUBLICATIONS

Office Action for Office Action for Korean Patent Application No. 10-2018-7003632, dated Oct. 30, 2019, 7 pages.

* cited by examiner

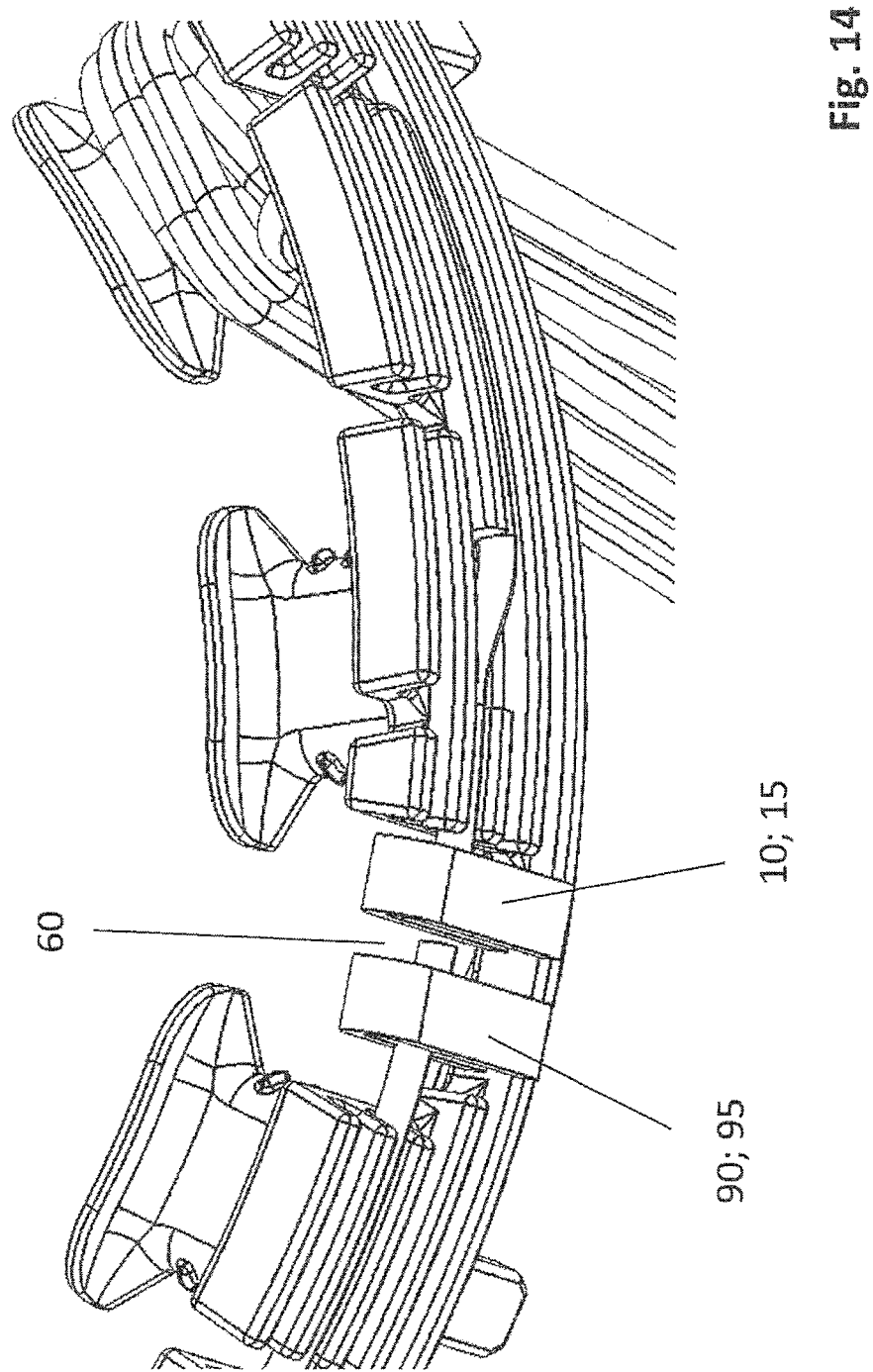

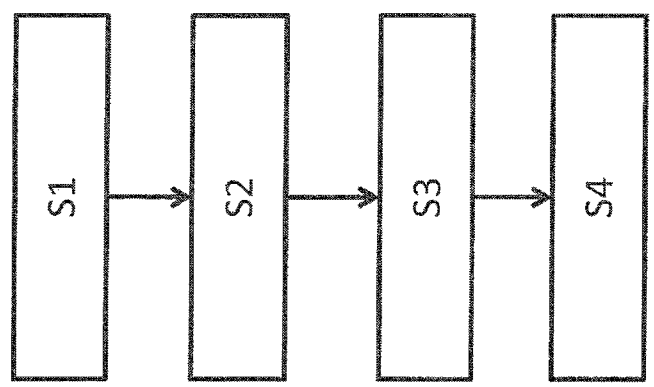

STATOR ARRANGEMENT, ELECTRIC THREE-PHASE GENERATOR AND METHOD FOR PRODUCING A STATOR ARRANGEMENT

CROSS-REFERENCE TO RELATED APPLICATION

This Application is a Section 371 National Stage Application of International Application No, PCT/EP2016/066081, filed Jul. 7, 2016 and published as WO 2017/005836 A1 on Jan. 12, 2017, and claims priority from German Patent Application No. 10 2015 212 821.0, filed on Jul. 9, 2015, before the German Patent Office, the contents of which are hereby incorporated by reference in their entirety.

FIELD OF THE INVENTION

The present invention relates to a stator arrangement, to an electric three-phase generator and to a method for producing a stator arrangement.

TECHNICAL BACKGROUND

Electric motors are electric machines which can be found in many forms. Electric motors having a star connection can thus also be found. A star connection of this kind is the interconnection of, for example, three connections via a resistor at a common point. The resulting combination forms the centre point, which is also referred to as the star point or neutral point. A star point connection has the advantage that for symmetric loading, that is to say the three load phase windings each have the same impedance, it is possible to tap two different voltages.

For electric motors, a switch wafer is sometimes used for the stator windings of the star point connection. In this case, it is necessary for each individual stator winding to be wound by its own winding wire and contacted at the star point. Forming said star point is expensive since several complex method steps are required.

DE 10 2011 082 665 A1 describes a stator for an electric machine, comprising a plurality of stator segments which form a stator ring and comprise support teeth for holding coils which can be supplied with power and radially outer yoke segments which form the outside of the stator ring and are supports for the radially inwardly directed support teeth, each stator segment comprising three support teeth for holding in each case one coil and all the coils of a stator segment being wound from a common, continuous coil wire. For this stator, too, several work steps are required to form the star point, since the individual coil wires of the stator segments are first wound separately and subsequently need to be connected in order to form a star point.

SUMMARY OF THE INVENTION

Against this background, one problem addressed by the present invention is that of making it possible to connect the stator windings in a simpler manner.

This problem is solved according to the invention by a stator arrangement by an electric three-phase generator and by a method for producing a stator arrangement.

Accordingly, there is provided:

a stator arrangement for an electric three-phase generator, comprising a plurality of stator teeth, comprising a contacting device which is arranged on an end portion of the stator teeth, comprising a continuously wound winding wire which is wound in each case about individual stator teeth in order to form stator tooth windings and portions of which are arranged on the contacting device between the individual stator teeth, comprising a connecting element, which is arranged on the contacting device and designed to electrically connect portions of the winding wire arranged directly adjacently on the contacting device in order to form a star point.

An electric three-phase generator comprising a stator arrangement according to the invention is further provided.

In addition, a method for producing a stator arrangement is provided, which method comprises the following steps: providing a plurality of stator teeth; arranging a contacting device on an end face of the stator teeth; winding individual stator teeth with a winding wire in an uninterrupted manner in order to form stator tooth windings; arranging the winding wire on the contacting device; and electrically connecting portions of the winding wire arranged on the contacting device in order to form a star point.

The concept underlying the present invention consists in forming a stator arrangement comprising a star connection by means of a contacting device comprising a continuously wound winding wire, and forming the star point by means of a connecting element. In this way, the winding process for the stator arrangement can be automated and carried out by means of only a few method steps. A plurality of separately wound windings and frequent separating processes of the winding wire between the winding processes are no longer required owing to this design of a stator arrangement. As a result, the production time for producing the stator arrangement can be significantly reduced, which results in lower production costs. In addition, less wire is required, since the stator can be continuously wound and does not need any long connection paths. Moreover, this design also makes it possible to form the stator arrangement so as to have a shorter axial overall length, since fewer axial winding wire layers are required than in a comparable delta connection.

The contacting device is arranged on an end portion of the stator teeth. For example, the contacting device is arranged on an end face of the stator teeth which is not used to hold the winding wire. It is also possible, for example, that the contacting device extends around the stator teeth or is arranged on the outer surface of the stator.

In addition, this design of a stator arrangement also makes it possible for the star point, if required, to be able to be separated without significant effort, as a result of which a completely redundant winding system is produced, as is required in steering motors, for example.

Another advantage of the stator arrangement according to the invention is that the star point, which is formed by electrically connecting the portions of the winding wire arranged on the contacting device, is formed locally at one point. The portions of the winding wire to be connected are arranged directly adjacently to one another, and therefore the portions of the winding wire can be connected very easily and the connecting element can be produced cost-effectively. The portions of the winding wire can thus be connected very easily and without significant expense.

According to the invention, the contacting device comprises a plurality of wire guides which are provided on the outer surface of the contacting device and which are arranged and designed to position the portions of the winding wire arranged on the contacting device in a stationary manner. In this way, the risk of a short circuit can be reduced, since the portions of the winding wire are spatially separated from one another, and in this way can be well isolated from one another. The wire guides can hold the portions of the winding wire in an interlocking and/or frictional manner, as a result of which the portions can be particularly well positioned.

Additional advantageous embodiments and developments will become apparent from the additional dependent claims and from the description with reference to the figures of the drawings.

In an advantageous embodiment, the connecting element is designed as a terminal and/or as a welded joint and/or as an insulation displacement contact. For example, a terminal can be used which comprises three or more recesses, which each hold, in an interlocking and/or frictional manner, the portions of the winding wire to be connected. This design of the connecting element makes it possible for the connection to be carried out in a very simple and reliable manner. However, a welded joint can also be used as a connecting element. It is also possible to use only one piece of wire to form the star point. An insulation displacement contact is also suitable as the connecting element. An advantage of using an insulation displacement contact is that it is not necessary to solder, screw or strip the winding wire in order to form the star point. Another LSA technique can also be used to form the star point.

In another advantageous embodiment, the contacting device comprises an annular main body made of a plastics material. The main body preferably has the same outer diameter as the stator. Advantageously, the contacting device is designed as an injection-moulded plastics part, as a result of which the production costs can be significantly reduced.

In another advantageous embodiment, the contacting device comprises positioning pins on the side facing the stator teeth, which pins are arranged and designed to position the contacting device with respect to the stator teeth. In this way, errors in the production of the stator arrangement and in particular when connecting the portions of the winding wire can be prevented, since the contacting device is always oriented correctly with respect to the stator teeth.

In another advantageous embodiment, the wire guides are arranged on the outer surface of the contacting device in a plurality of series. For example, the contacting device comprises three or more series of wire guides, one series being provided for the first phase, a second series for a second phase and a third series for a third phase.

In another advantageous embodiment, the series of wire guides comprise wire transition regions which are arranged and designed to guide the winding wire from one series of wire guides to another series of wire guides. The wire transition regions are, for example, designed as recesses and allow the winding wire to transfer from one series to another series of wire guides.

In another advantageous embodiment, the contacting device comprises a plurality of wire feedthroughs which are provided on the outer surface of the contacting device on the side remote from the stator teeth and which are designed to feed the winding wire through the contacting device. The wire feedthroughs are advantageously designed as slots which have a predetermined length, in order to position the winding wire with respect to a wire guide. In this way, errors when winding the stator teeth can be prevented, since the slots arrange the winding wire on the predetermined wire guide series.

In another advantageous embodiment, at least one additional connecting element is provided, which is arranged on the contacting device and designed to electrically connect portions of the winding wire arranged on the contacting device in order to form at least one second star point. For this purpose, the winding wire can be separated so that a separation point is formed between the two star points. In this way, two parallel and redundant star connections are produced, as a result of which the operational reliability of the electric machine can be increased. Viewed three-dimensionally, the second star point can be formed at the same point or in close proximity to the first star point. In this way, the second star point can be formed very simply.

The above embodiments and developments can be combined with one another as desired, where appropriate. Further possible embodiments, developments and implementations of the invention also include combinations of features of the invention that have been previously described or are described in the following with respect to the embodiments, even if not explicitly mentioned. In particular, a person skilled in the art will also add individual aspects as improvements or additions to the relevant basic form of the present invention.

BRIEF DESCRIPTION OF THE DRAWINGS

The present invention is explained below in greater detail with reference to the embodiments specified in the schematic figures of the drawings, in which:

FIG. 14 is a view of a section of the contacting device according to the second embodiment; and FIG. 15 is schematic flow diagram of a method according to the invention for producing a stator arrangement.

The accompanying drawings are intended to provide further understanding of the embodiments of the invention. They illustrate embodiments and, together with the description, are used to explain principles and concepts of the invention. Other embodiments and many of the mentioned advantages will become apparent from the drawings. The elements of the drawings are not necessarily shown to scale relative to one another.

In the figures of the drawings, identical, functionally equivalent and equivalently operating elements, features and components are provided with the same reference signs in each case, unless stated otherwise.

DESCRIPTION OF EMBODIMENTS

Figure 1:
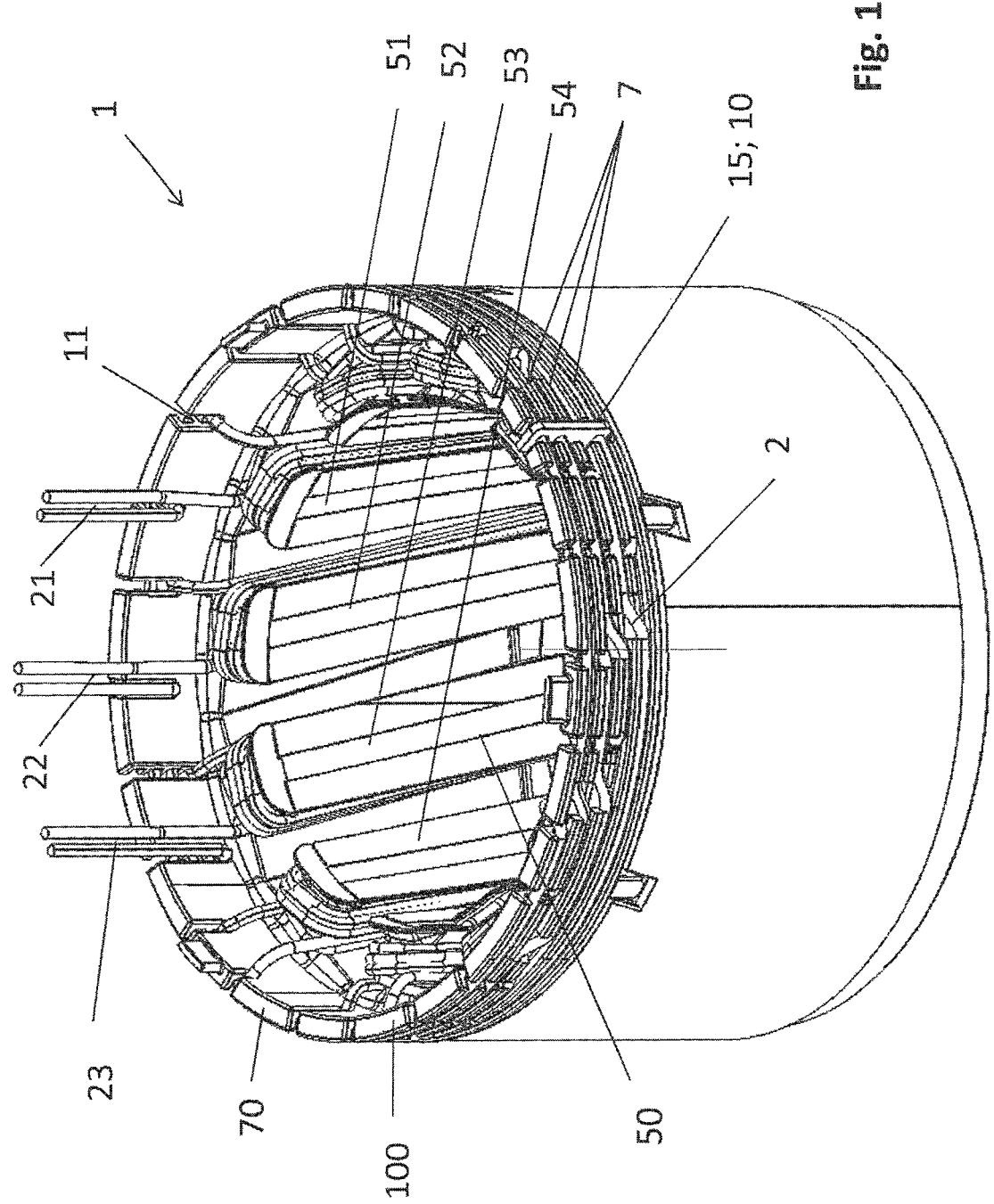
FIG. 1 is a perspective view of a stator arrangement according to the invention according to a first embodiment.

FIG. 1 is a perspective view of a stator arrangement 1 according to the invention for an electric machine according to a first embodiment. The stator arrangement 1 comprises, for example, a laminated stator core 50, which comprises a plurality of stator teeth 51; 52; 53; 54. On the laminated stator core 50, a contacting device 100 is arranged on an end portion of the stator teeth 51; 52; 53; 54. The contacting device 100 comprises an annular main body 70, which is made of a plastics material, for example. The stator arrangement 1 comprises a continuously wound winding wire 2 which is wound in each case about individual stator teeth 51; 52; 53; 54 in order to form stator tooth windings and portions of which are arranged on the contacting device 100 between the stator teeth.

In addition, a connecting element 10 is provided, which is arranged on the contacting device 100 and designed to electrically connect portions of the winding wire 2 arranged near to the contacting device 100 in order to form a star point 15. The connecting element 10 is thus only present locally at one point, and connects the directly adjacent portions of the winding wire 2.

The stator arrangement 1 shown is, for example, a stator arrangement 1 for a 3-phase generator. For example, the windings of the stator teeth 51, 52 and 53 each have distinct phases, the star point 15 of the star connection being formed by connecting the winding wire 2 by means of the connecting element 10.

The winding wire 2 is first wound about the stator tooth 53, for example, and then all additional stator windings which have the same phase are wound. Some of the winding wire 2 is transferred from one stator tooth to the next stator tooth of the same phase via the contacting device 100. When all of the stator windings of the first phase are wound, the winding wire 2 is transferred to the stator tooth provided for the second phase. All of the stator windings of the second phase are then wound, some of the winding wire 2 being transferred from one stator tooth to the next stator tooth of the same phase via the contacting device 100. All of the stator windings of the third phase are then wound, some of the winding wire 2 being transferred from one stator tooth to the next stator tooth of the third phase via the contacting device 100. The star point 15 for the star connection of the three phases is formed by means of the connecting element 10 on the contacting device 100. For this purpose, the portions of the winding wire 2 of the first phase, the second phase and the third phase are electrically connected by the connecting element 10. The connecting element 10 is designed as a terminal in this embodiment and is shown in more detail in FIG. 4.

Figure 2:
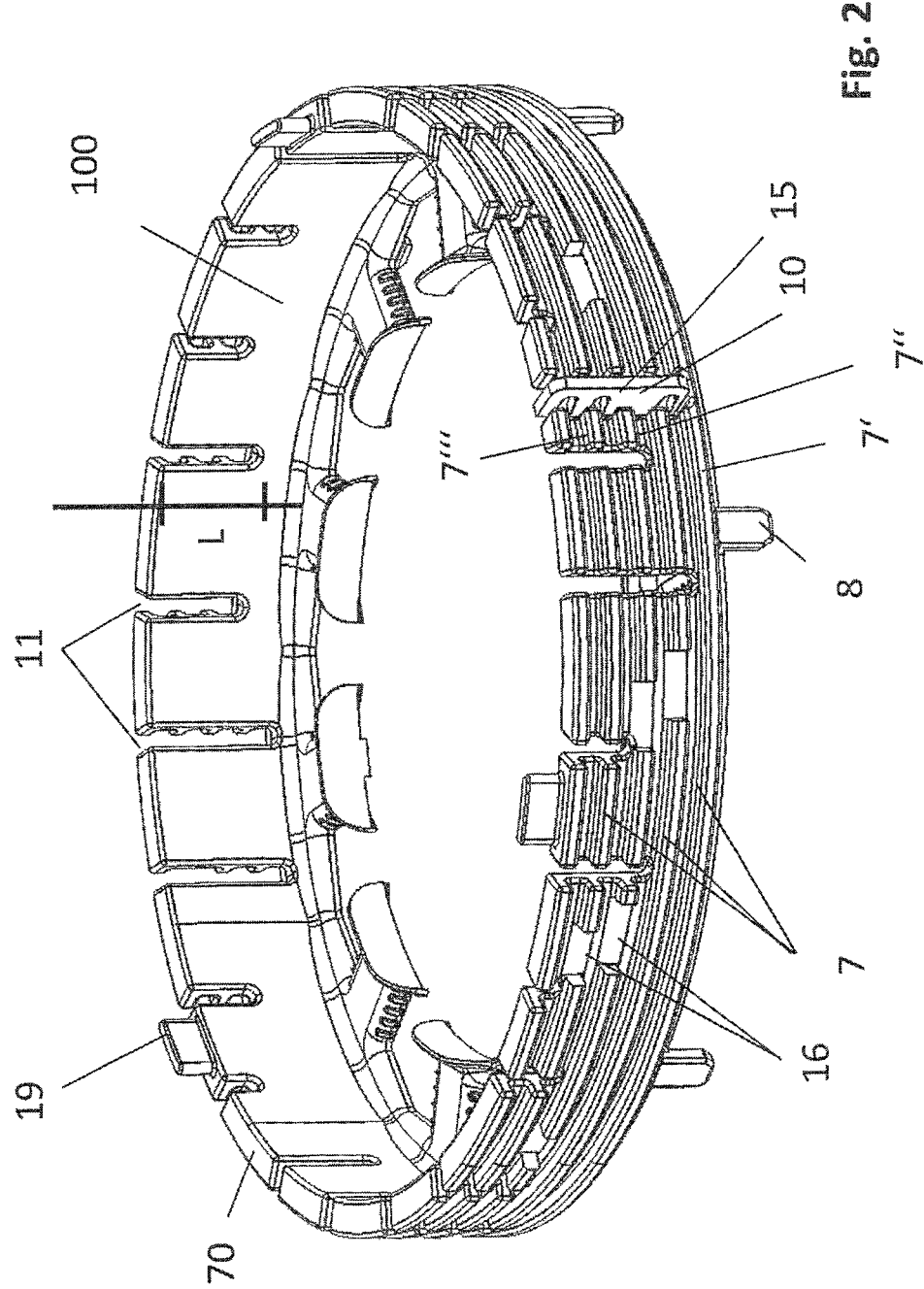
FIG. 2 is a perspective view of the contacting device according to the first embodiment.

FIG. 2 is a perspective view of the contacting device 100 according to the first embodiment. The contacting device 100 is made from a plastics material, for example. The contacting device 100 comprises an annular main body 70. In order to mount the contacting device 100 on the stator teeth 51; 52; 53; 54, positioning pins 8 are provided which engage in recesses in the stator teeth 51; 52; 53; 54 or in a housing (not shown) in an interlocking and/or frictional manner.

The contacting device 100 further comprises a plurality of wire guides 7 which are formed on the outside of the contacting device 100 in the circumferential direction. The wire guides 7 are designed to hold the winding wire 2 in position on the contacting device 100. In this way, a short circuit can be prevented by a contact having two winding wire portions. The wire guides 7 are arranged in a plurality of series 7'; 7''; 7''', for example. The wire guides 7 are designed to hold the winding wire 2 in an interlocking and/or frictional manner. For example, the wire guides 7 are designed as slots. A wedge-shaped design of the wire guides 7 is also conceivable. The series 7'; 7''; 7''' can be arranged in parallel with one another, for example.

The contacting device 100 further comprises a plurality of wire feedthroughs 11. The wire feedthroughs 11 are designed, for example, as slots which have a predetermined length L, in order to position the winding wire 2 with respect to the wire guides 7. However, the wire feedthroughs 11 can also be designed as holes or notches.

The winding wire 2 can be guided from the inside of the contacting device 100 to the outside of the contacting device 100, and/or from the outside of the contacting device 100 to the inside of the contacting device 100, by means of the wire feedthroughs 11.

In addition, the contacting device comprises wire transition regions 16 which make it possible to transfer the winding wire 2 from one series 7' of wire guides 7 to another series 7'' of wire guides 7.

Figure 3:
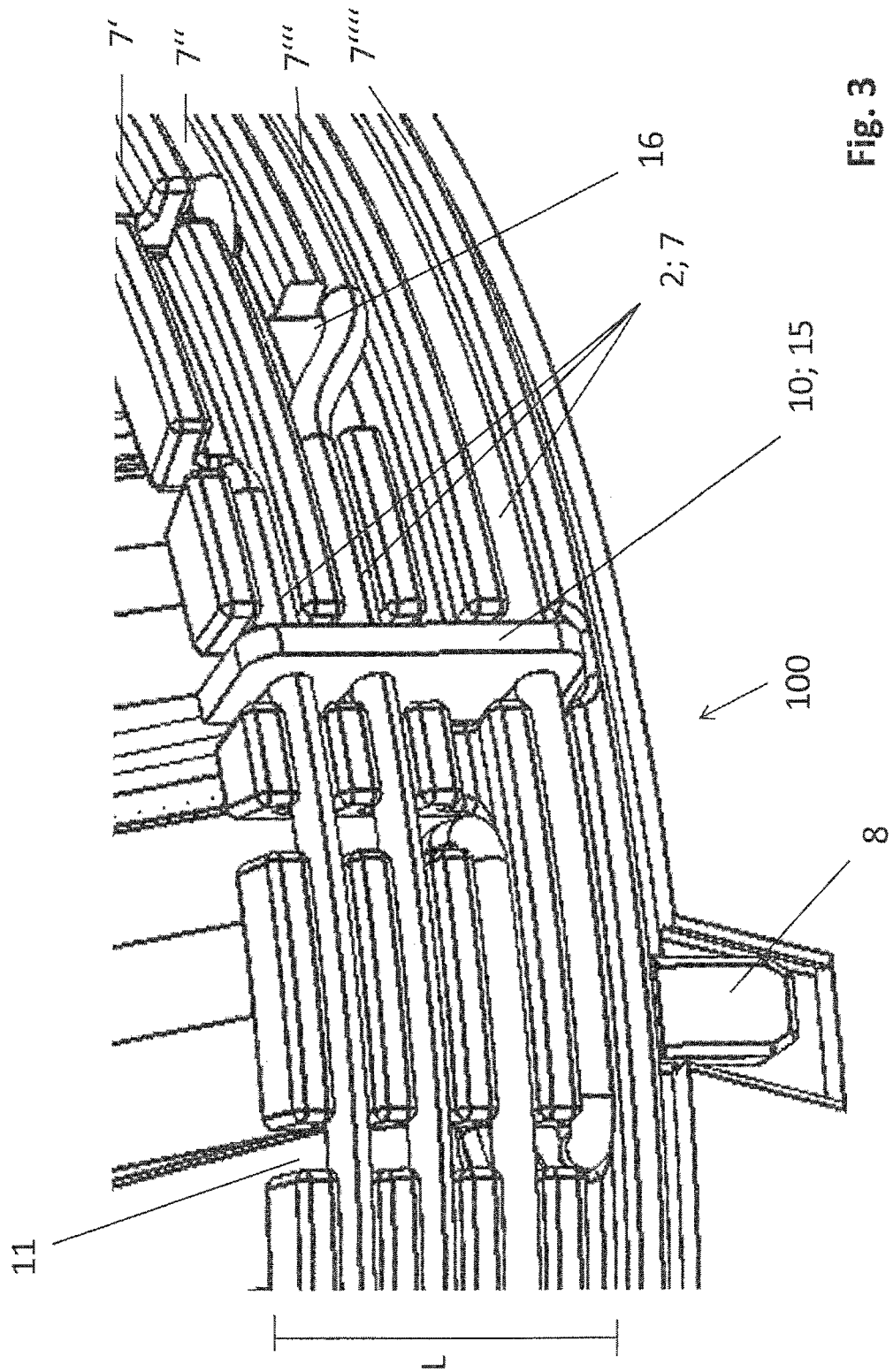
FIG. 3 is a view of a section of the contacting device according to the first embodiment.

FIG. 3 is a view of a section of the contacting device 100 according to the invention according to the first embodiment. In this embodiment, the contacting device 100 comprises four series 7'; 7''; 7'''; 7'''' of wire guides 7. The contacting device 100 further comprises positioning pins 8 in order to position the contacting device 100 with respect to the stator teeth. The contacting device 100 further comprises wire feedthroughs 11, which are designed as slots. The wire feedthroughs 11 each have a predetermined length L, in order to position the winding wire 2 with respect to a wire guide 7.

Figure 4:
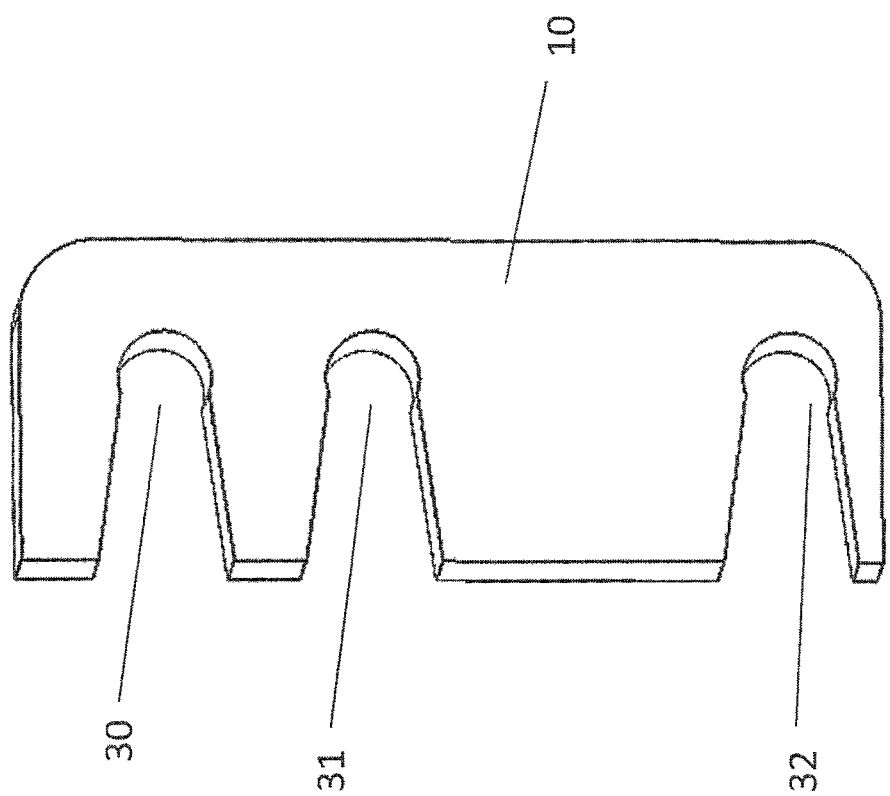
FIG. 4 is a view of the connecting element according to the first embodiment.

FIG. 4 is a view of the connecting element 10 according to the first embodiment. The connecting element 10 is designed as a terminal 10, for example. The terminal 10 comprises three recesses 30; 31; and 32, which are designed to hold the winding wire 2 in an interlocking and/or frictional manner. For this purpose, the recesses 30; 31; 32 have a wedge-shaped design, for example. The terminal 10 can be manufactured as a stamped part made of sheet metal, for example. The connecting element 10 can also be designed as a welded joint and/or as an insulation displacement contact.

Figure 5:
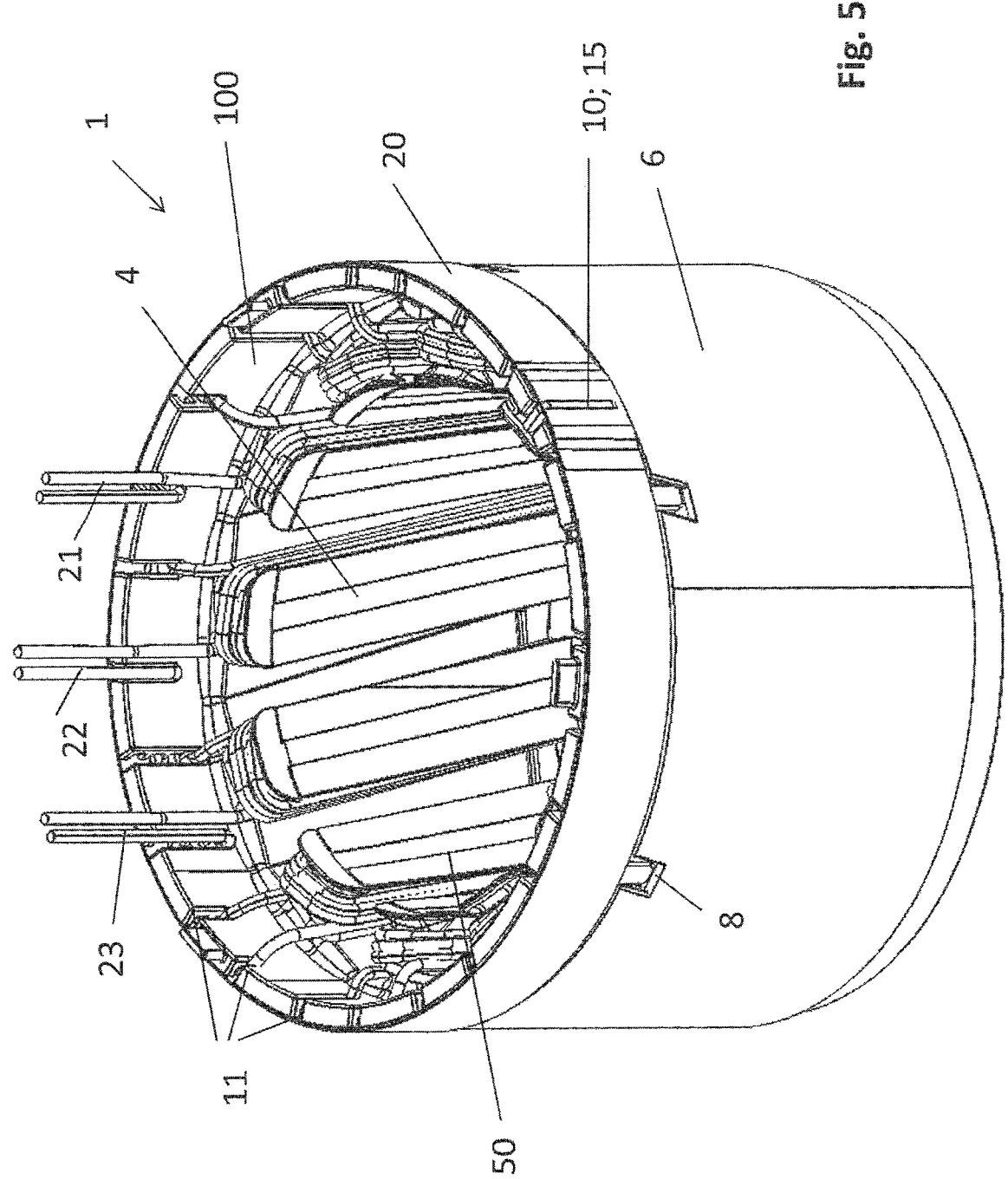
FIG. 5 is a perspective view of the stator arrangement according to the first embodiment.

FIG. 5 is a perspective view of the stator arrangement 100 according to the invention according to the first embodiment. In this embodiment, a housing 6 is arranged around the laminated stator core 50. In addition, in this embodiment a cover 20 is arranged around the contacting device 100. In this way, the stator arrangement 1 can be well protected against external environmental influences. Furthermore, in this view it can be seen that two winding wire portions are used per phase connection 21; 22; 23.

Figure 6:
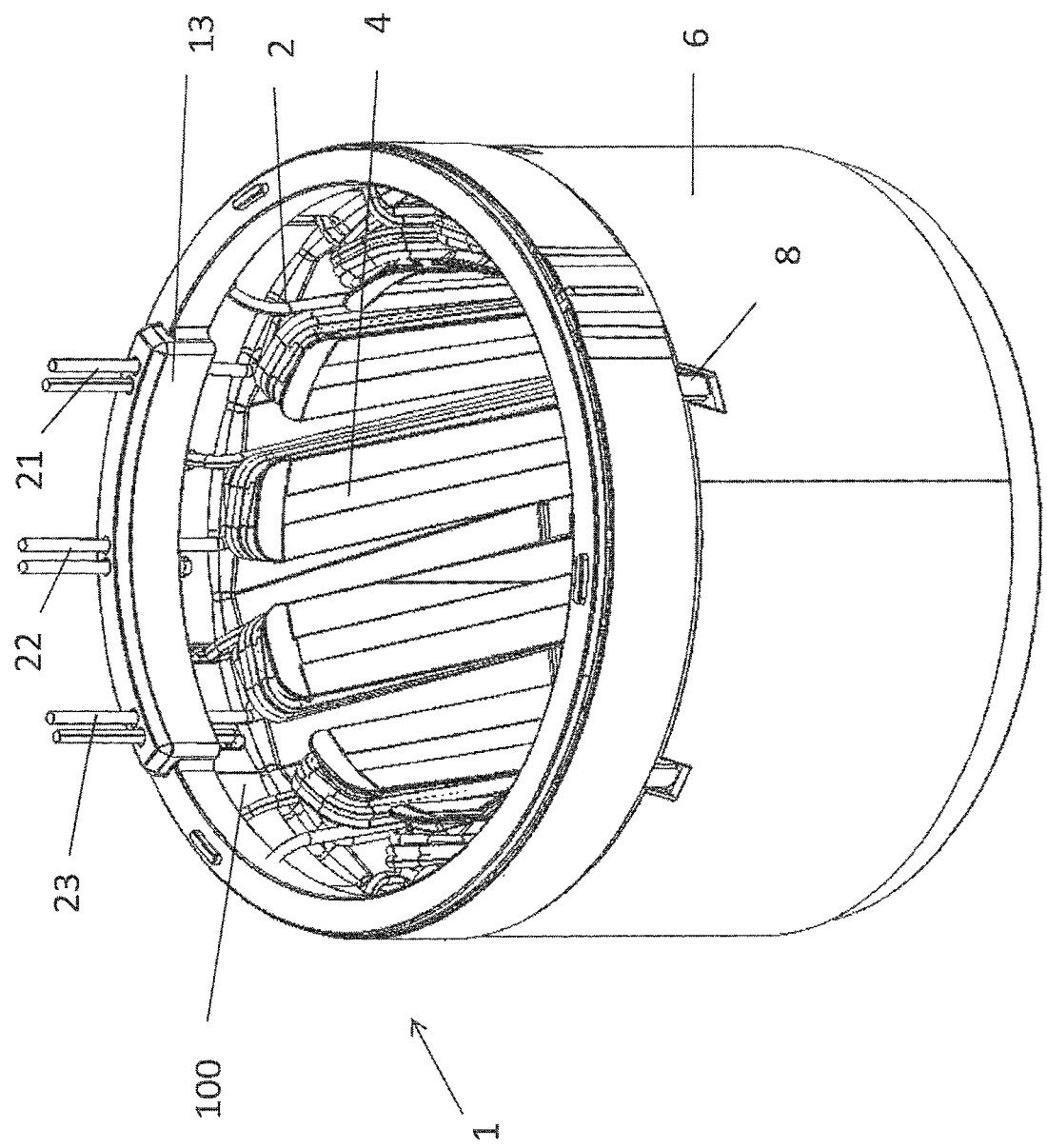
FIG. 6 is a perspective view of the stator arrangement according to the first embodiment.

FIG. 6 is a perspective view of the stator arrangement 1 according to the first embodiment. In this embodiment, the stator arrangement 1 comprises a connection device 13 which is designed to position the phase connections 21; 22; and 23 for contacting.

Figure 7:
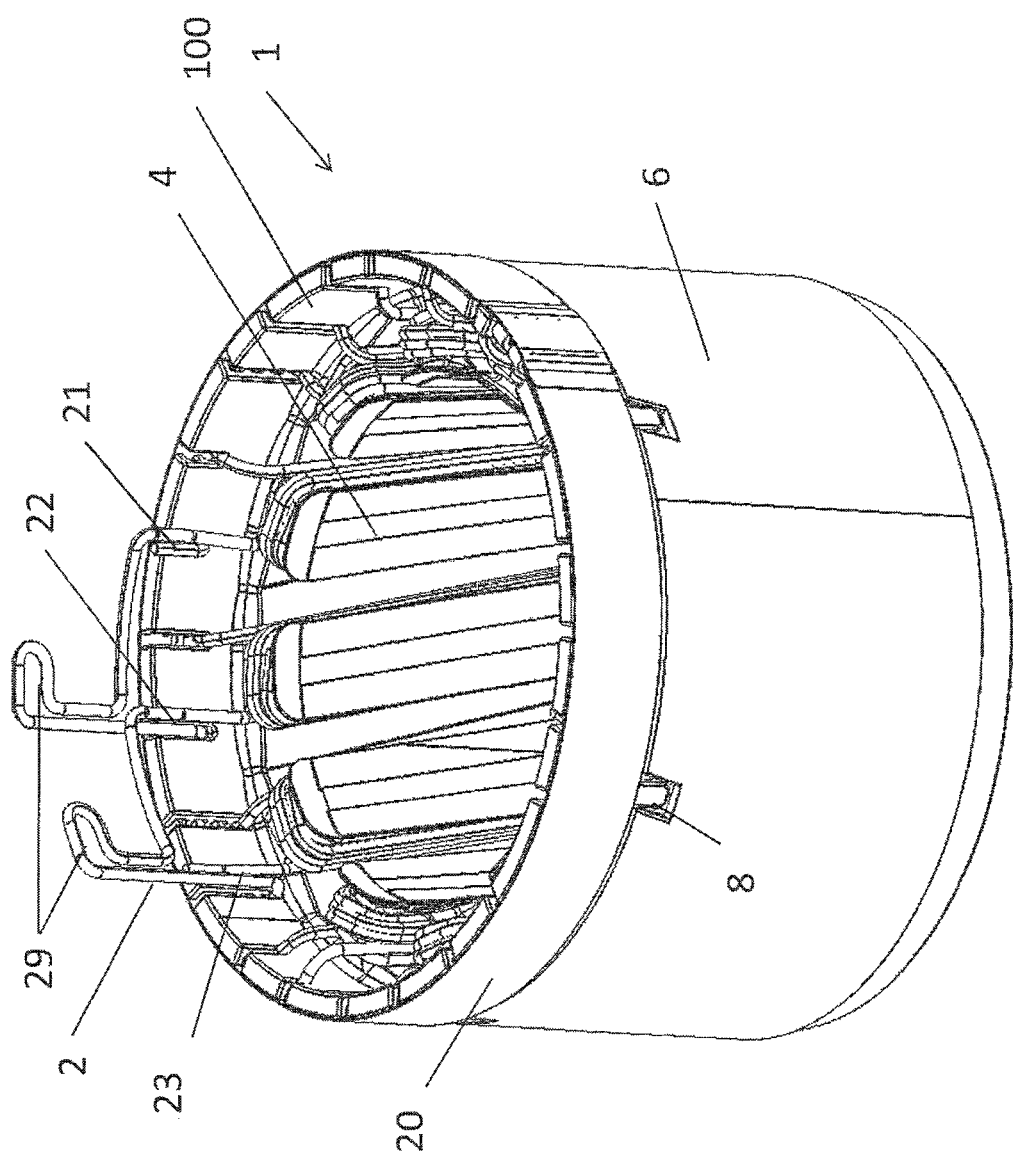
FIG. 7 is a perspective view of the stator arrangement according to the first embodiment.

FIG. 7 is a perspective view of the stator arrangement 1 according to the first embodiment. In this view, it can be seen how the winding wire 2 is arranged so as to form the phase connections 21; 22; 23. So that sufficient wire is available to form the phase connections 21; 22; 23, the winding wire 2 is provided with a loop 29 when transferring from one phase winding to another phase winding, which loop provides sufficient winding wire 2 to form a phase connection.

Figure 8:
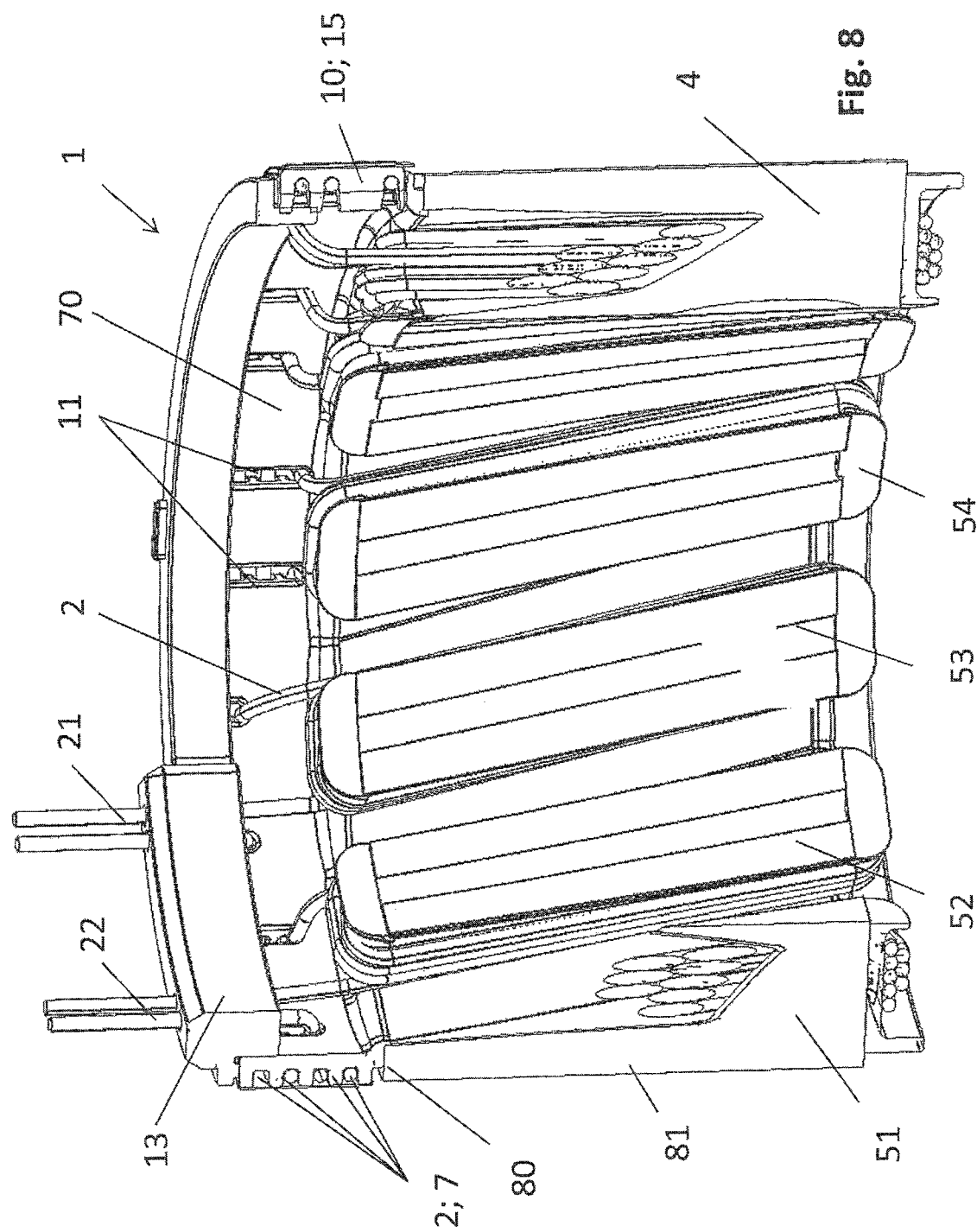
FIG. 8 is a sectional view of the stator arrangement according to the first embodiment.

FIG. 8 is a sectional view of the stator arrangement 1 according to the first embodiment. In this view, the connection of the star point 15 by means of the connecting element 10 can be seen clearly. In addition, the winding wire 2 and the wire guides 7 can be seen clearly. In addition, this view makes it possible to clearly see the arrangement of the contacting device 100 on the end portion 80 of the stator teeth. The contacting device 100 is arranged, for example, on the tooth back 81 of the stator teeth 51; 52; 53; 54.

Figure 9:
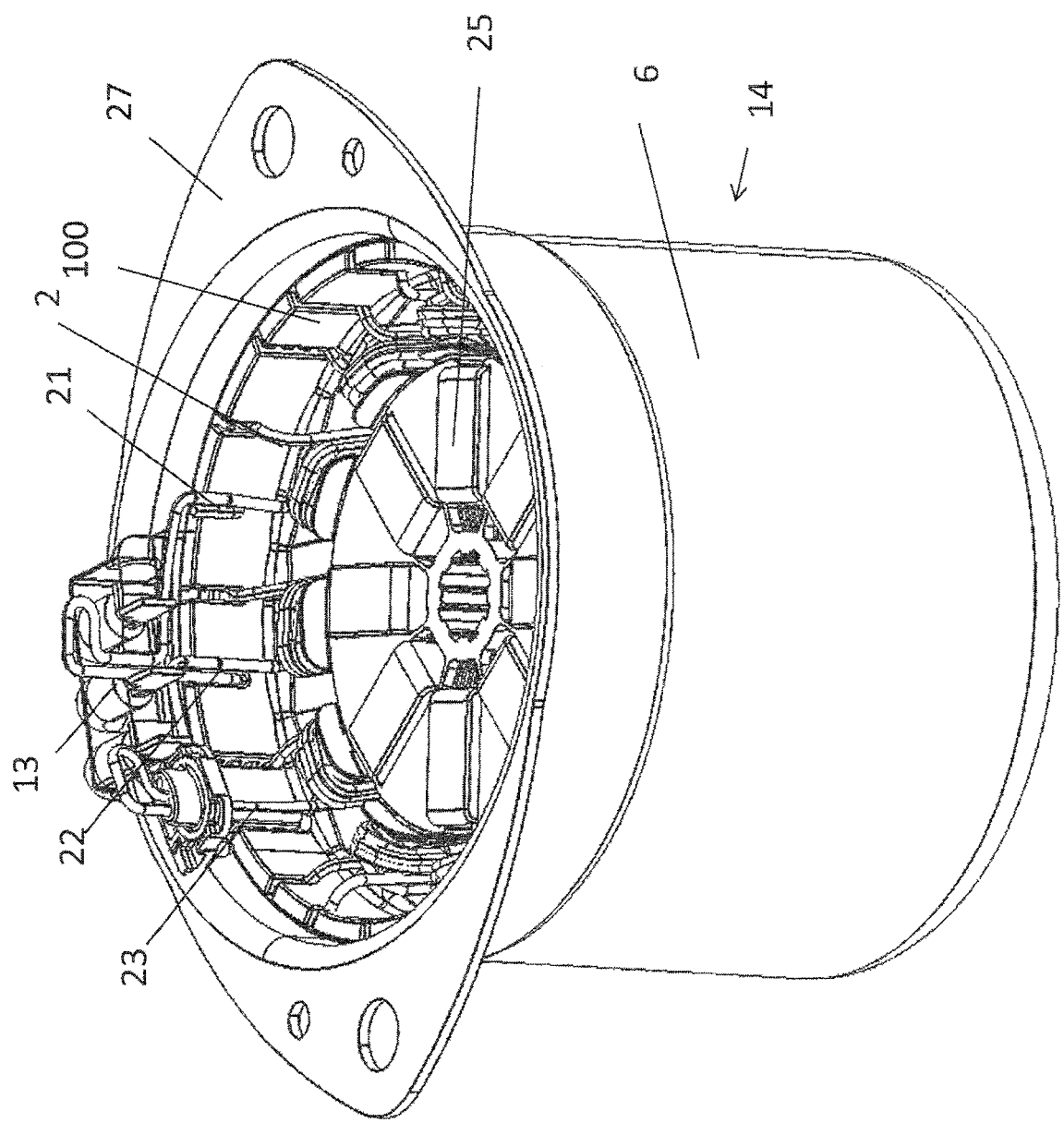
FIG. 9 is a perspective view of an electric machine according to the invention according to a first embodiment.

FIG. 9 is a perspective view of an electric machine 14 according to the invention according to a first embodiment. The electric machine 14 is designed as a three-phase generator 14, for example. The three-phase generator 14 comprises a rotor 25 which comprises a plurality of permanent magnets. In addition, it can be seen from this view how the phase connections 21; 22; 23 are connected in the connection device 13. In order to fasten the electric machine 14, a flange 27 is provided which comprises fastening holes.

Figure 10:
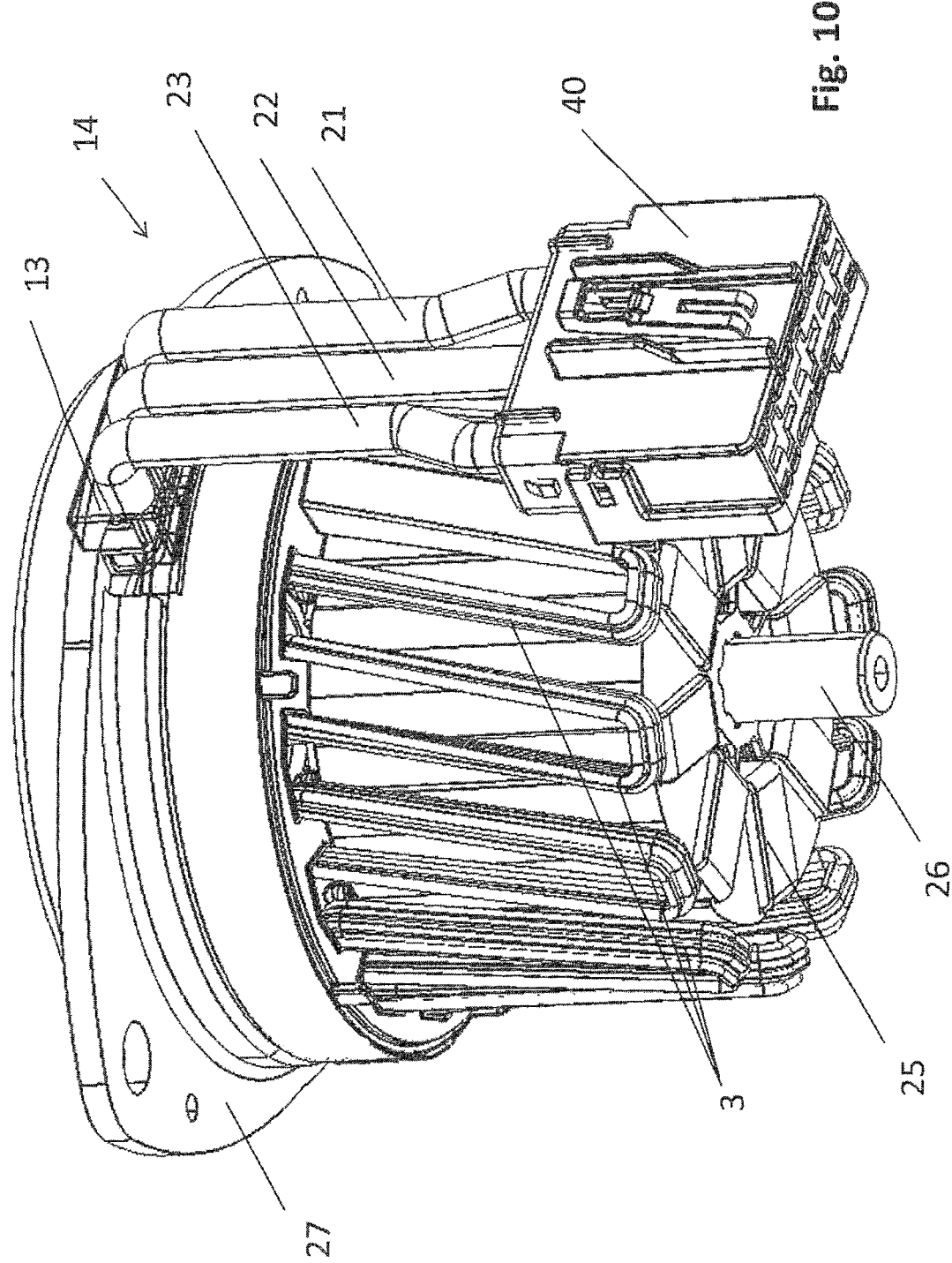
FIG. 10 is a perspective view of the electric machine according to the first embodiment.

FIG. 10 is a perspective view of the electric machine 14 according to the invention according to the first embodiment. The electric machine 14 is shown obliquely from below. In this view, a shaft 26 is mounted in the rotor 25. In addition, the phase connections 21; 22; 23 are housed in a connector 40.

Figure 11:
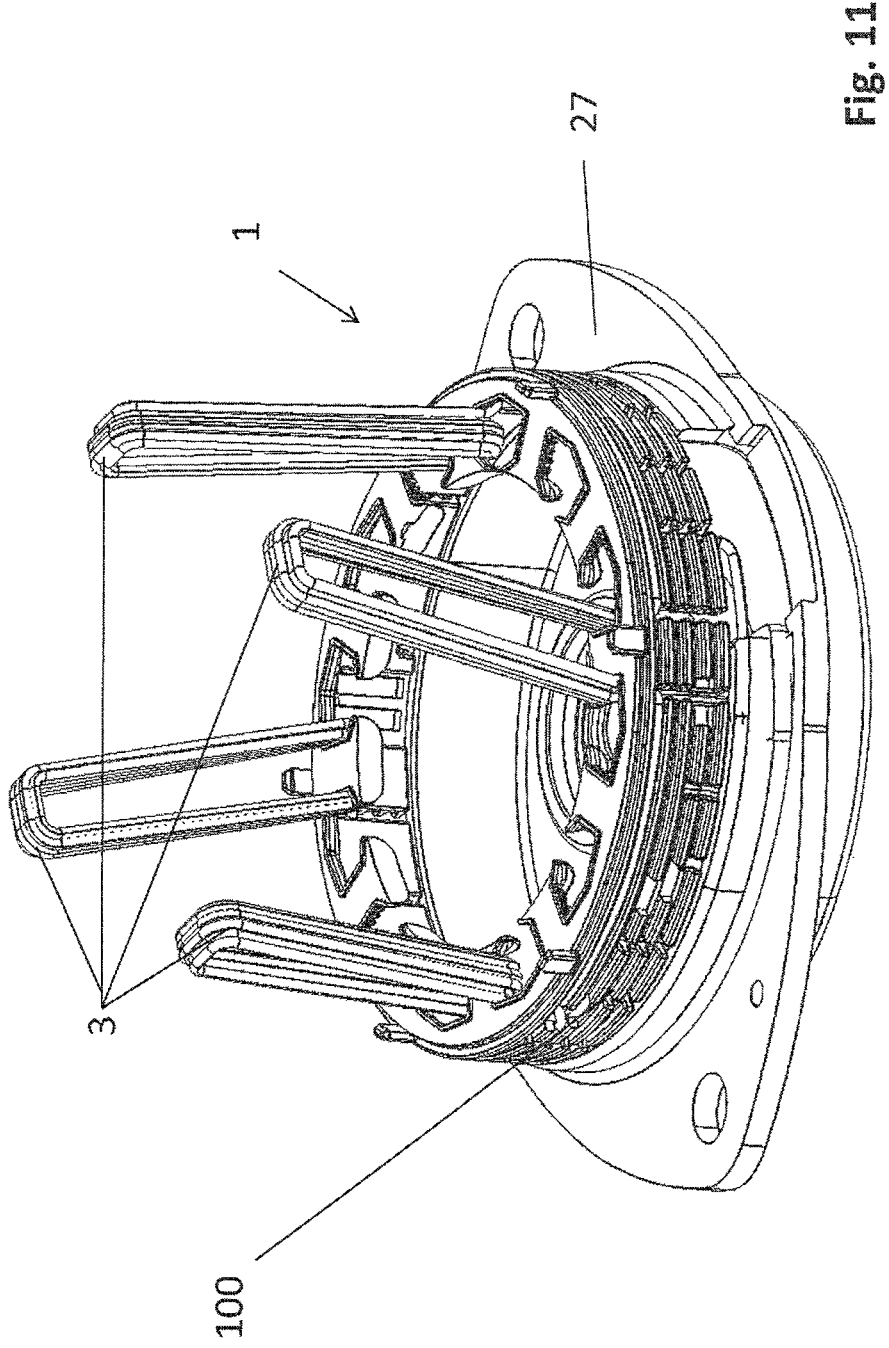
FIG. 11 is a perspective view of the stator arrangement according to the first embodiment.

FIG. 11 is a perspective view of the stator arrangement 1 according to the invention according to the first embodiment. This view shows how the stator winding 3 is wound for the first phase, the stator teeth and the stator not being shown.

Figure 12:
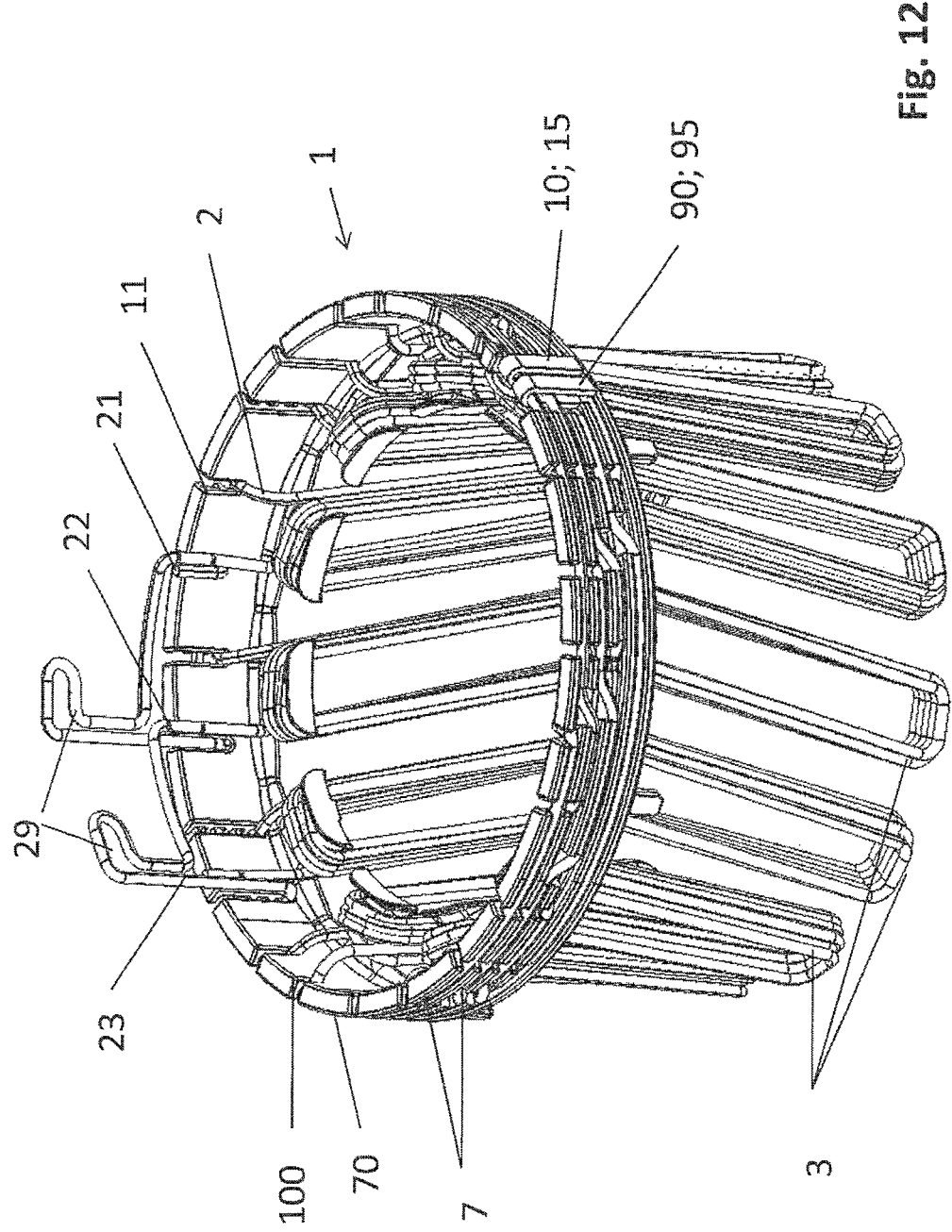
FIG. 12 is a perspective view of a stator arrangement according to the invention according to a second embodiment.

FIG. 12 is a perspective view of a stator arrangement 1 according to the invention according to a second embodiment. In this embodiment, an additional connecting element 90 is provided, which is arranged on the contacting device 100 and designed to electrically connect portions of the winding wire 2 arranged on the contacting device 100 in order to form at least one second star point 95. In this embodiment, the connecting element 90 and the connecting element 10 are formed as a single wire, which elements are hot-caulked to the corresponding portions of the winding wire 2. A terminal as shown in the first embodiment, and/or an insulation displacement contact and/or a welded joint can also be used as a connecting element.

As shown in this embodiment, the first connecting element 10 and the additional connecting element 90 are arranged directly adjacently to one another. In this way, the amount of work required to form the second star point 95 is reduced.

Figure 13:
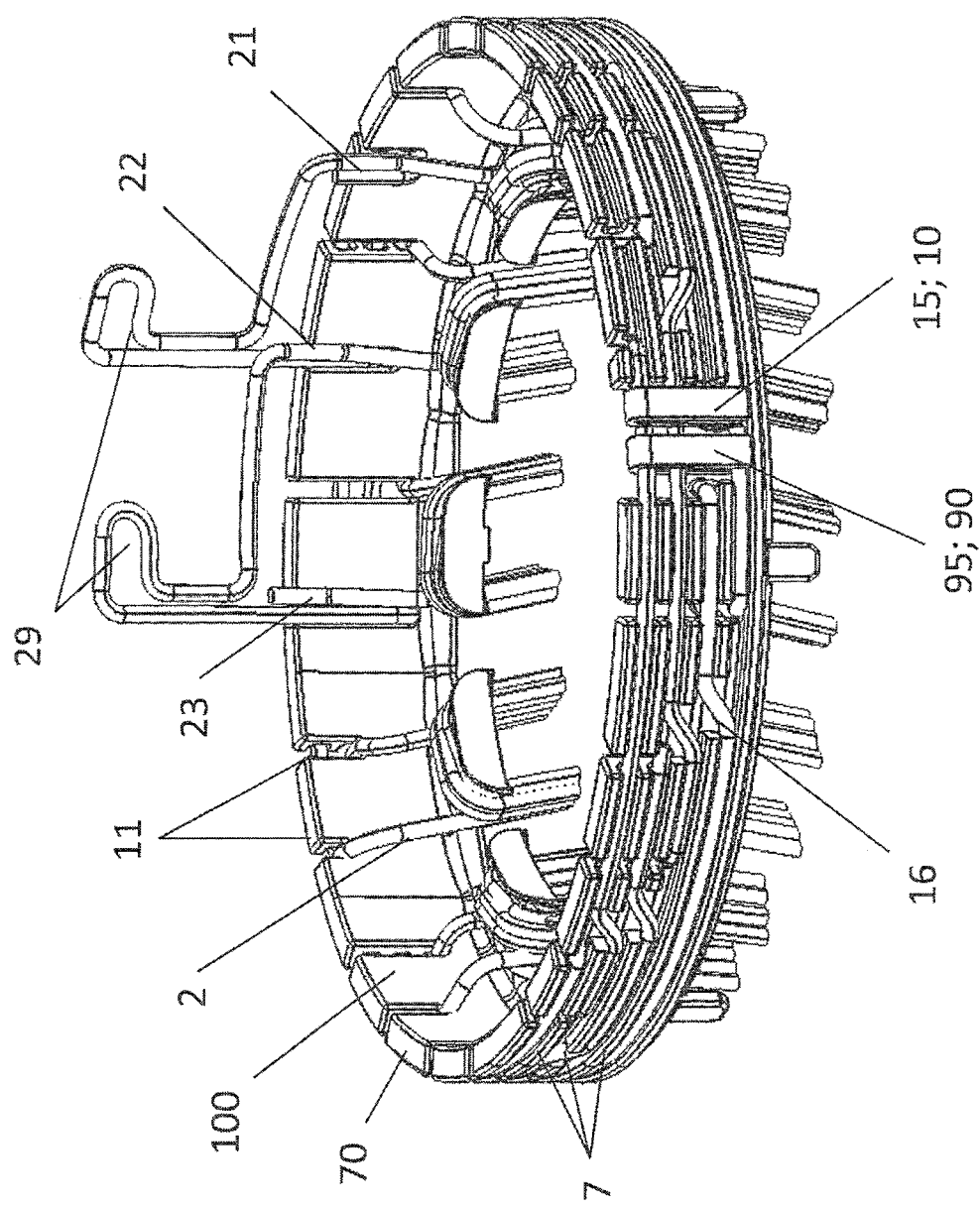
FIG. 13 is a perspective view of a contacting device according to the second embodiment.

FIG. 13 is a perspective view of the contacting device 100 according to the invention according to the second embodiment. In this view, the connecting element 90 and the connecting element 10 can be seen clearly. The connecting element 90 and the connecting element 10 are each designed as wire portions and are fastened around the corresponding portions of the winding wire 2 in order to electrically connect the corresponding portions. For example, the connecting elements 10 and 90 are hot-caulked to the corresponding portions of the winding wire. A first star point 15 and another star point 95 are formed in this way. This results in two star connections which are connected in parallel. This design increases the operational reliability of the stator arrangement since two redundant star connections are produced. The connecting element 10 and/or the connecting element 90 can also be designed as insulation displacement contacts or as a welded joint.

FIG. 14 is a view of a section of a contacting device 100 according to the invention. It can be seen in this view that the winding wire has a separation point 60 between the star point 15 and the start point 90.

FIG. 15 is schematic flow diagram of a method according to the invention for producing a stator arrangement. In step S1, a plurality of stator teeth is provided. In step S2, a contacting device is arranged on an end face of the stator teeth. In step S3, individual stator teeth are wound with a winding wire in an uninterrupted manner in order to form stator tooth windings, and the winding wire is arranged on the contacting device. In step S4, portions of the winding wire arranged on the contacting device are electrically connected in order to form a star point.

Although the present invention has hitherto been described entirely by way of preferred embodiments, it is not limited thereto, but can be modified in various ways.

LIST OF REFERENCE SIGNS 1 stator arrangement
2 wire
3 stator tooth winding
4 stator
6 housing
7 wire guide
8 positioning pins for the contacting unit
10 connecting element
11 wire feedthrough
13 connection device
14 three-phase generator
15 star point
16 wire transition region
20 cover
21 first phase connection
22 second phase connection
23 third phase connection
25 rotor
26 shaft
27 flange
29 wire loop
30 recess
31 recess
33 recess
50 laminated stator core
51 stator tooth
52 stator tooth
53 stator tooth
54 stator tooth
60 separation point
70 main body
80 end portion of the stator tooth
81 tooth back
90 second connecting element
95 second star point
100 contacting device

The invention claimed is:

1. A stator arrangement for an electric three-phase generator,
comprising a plurality of stator teeth,
comprising a contacting device, which is arranged on an end portion of the stator teeth,
comprising a continuously wound winding wire which is wound in each case about individual stator teeth in order to form stator tooth windings and portions of which are arranged on the contacting device between the individual stator teeth, comprising a connecting element, which is arranged on the contacting device and designed to electrically connect portions of the winding wire arranged on the contacting device in order to form a star point, wherein the wire guides are arranged on the outer surface of the contacting device in a plurality of series, wherein the series of wire guides comprise wire transition regions which are arranged and designed to guide the winding wire from one series of wire guides to another series of wire guides.

2. The stator arrangement according to claim 1, characterized in that
the connecting element is designed as a terminal and/or as a welded joint and/or as an insulation displacement contact.

3. The stator arrangement according to claim 1, characterized in that
the contacting device comprises an annular main body made of a plastics material.

4. The stator arrangement according to claim 1, characterized in that
the contacting device comprises positioning pins on the side facing the stator teeth, which pins are arranged and designed to position the contacting device with respect to the stator teeth.

5. The stator arrangement according to claim 1, characterized in that
the contacting device comprises a plurality of wire guides which are provided on the outer surface of the contacting device and which are arranged and designed to position the portions of the winding wire arranged on the contacting device in a stationary manner.

6. The stator arrangement according to claim 1, characterized in that
at least one additional connecting element is provided, which is arranged on the contacting device and designed to electrically connect the portions of the winding wire arranged on the contacting device in order to form at least one second star point.

7. An electric three-phase generator, comprising a stator arrangement according to claim 1.

8. A method for producing a stator arrangement, in particular for producing a stator arrangement according to claim 1, comprising the steps of:
providing a plurality of stator teeth,
arranging a contacting device on an end face of the stator teeth,
winding individual stator teeth with a winding wire in an uninterrupted manner in order to form stator tooth windings and arranging the winding wire on the contacting device;
electrically connecting portions of the winding wire arranged on the contacting device in order to form a star point.

9. A stator arrangement for an electric three-phase generator,
comprising a plurality of stator teeth,
comprising a contacting device, which is arranged on an end portion of the stator teeth,
comprising a continuously wound winding wire which is wound in each case about individual stator teeth in order to form stator tooth windings and portions of which are arranged on the contacting device between the individual stator teeth,
comprising a connecting element, which is arranged on the contacting device and designed to electrically connect portions of the winding wire arranged on the contacting device in order to form a star point,
wherein the contacting device comprises a plurality of wire feedthroughs which are provided on the outer surface of the contacting device on the side remote from the stator teeth and which are designed to feed the winding wire through the contacting device.

10. The stator arrangement according to claim 9, characterized in that
the wire feedthroughs are designed as slots which have a predetermined length (L), in order to position the winding wire with respect to a wire guide.

11. The stator arrangement according to claim 9, characterized in that
the connecting element is designed as a terminal and/or as a welded joint and/or as an insulation displacement contact.

12. The stator arrangement according to claim 9, characterized in that
the contacting device comprises an annular main body made of a plastics material.

13. The stator arrangement according to claim 9, characterized in that
the contacting device comprises positioning pins on the side facing the stator teeth, which pins are arranged and designed to position the contacting device with respect to the stator teeth.

14. The stator arrangement according to claim 9, characterized in that
the contacting device comprises a plurality of wire guides which are provided on the outer surface of the contacting device and which are arranged and designed to position the portions of the winding wire arranged on the contacting device in a stationary manner.

15. The stator arrangement according to claim 9, characterized in that
at least one additional connecting element is provided, which is arranged on the contacting device and designed to electrically connect the portions of the winding wire arranged on the contacting device in order to form at least one second star point.

16. An electric three-phase generator, comprising a stator arrangement according to claim 9.

17. A method for producing a stator arrangement, in particular for producing a stator arrangement according to claim 9, comprising the steps of:
providing a plurality of stator teeth,
arranging a contacting device on an end face of the stator teeth,
winding individual stator teeth with a winding wire in an uninterrupted manner in order to form stator tooth windings and arranging the winding wire on the contacting device;
electrically connecting portions of the winding wire arranged on the contacting device in order to form a star point.

* * * * *